(12) United States Patent
Toyama

(10) Patent No.: US 11,300,464 B2
(45) Date of Patent: Apr. 12, 2022

(54) SENSOR DEVICE

(71) Applicant: JTEKT CORPORATION, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/922,325

(22) Filed: Jul. 7, 2020

(65) Prior Publication Data
US 2021/0010880 A1 Jan. 14, 2021

(30) Foreign Application Priority Data

Jul. 9, 2019 (JP) .............................. JP2019-127796

(51) Int. Cl.
*G01L 3/10* (2006.01)
*B62D 1/20* (2006.01)
*G01B 7/30* (2006.01)
*G01L 5/22* (2006.01)
*B62D 5/04* (2006.01)

(52) U.S. Cl.
CPC ............... *G01L 3/105* (2013.01); *B62D 1/20* (2013.01); *G01B 7/30* (2013.01); *G01L 5/221* (2013.01); *B62D 5/0463* (2013.01)

(58) Field of Classification Search
CPC ............ G01B 7/30; G01L 3/104; G01L 3/105; G01L 5/221; B62D 5/0463; B62D 1/20
USPC ................................................... 73/862.331
See application file for complete search history.

(56) References Cited

U.S. PATENT DOCUMENTS

| 7,174,795 | B2* | 2/2007 | Feng | .................. | G01L 3/109 |
| | | | | | 73/862.332 |
| 7,868,611 | B2* | 1/2011 | Sano | .................. | G01D 5/12 |
| | | | | | 324/207.25 |
| 8,875,588 | B2* | 11/2014 | Kim | .................. | G01D 5/04 |
| | | | | | 73/862.325 |
| 8,943,879 | B2* | 2/2015 | Kang | .................. | B62D 6/10 |
| | | | | | 73/117.02 |
| 2016/0379754 | A1 | 12/2016 | Rachui et al. | | |
| 2017/0350776 | A1* | 12/2017 | Woo | .................. | B62D 15/021 |
| 2019/0113405 | A1 | 4/2019 | Toyama | | |

FOREIGN PATENT DOCUMENTS

| EP | 1688729 A1 | 8/2006 |
| EP | 2124021 A2 | 11/2009 |
| EP | 3470794 A1 | 4/2019 |
| EP | 3470808 A1 | 4/2019 |
| JP | 2019-074364 A | 5/2019 |
| KR | 10-2014-0080880 A | 7/2014 |

OTHER PUBLICATIONS

Nov. 23, 2020 Search Report issued in European Patent Application No. 20184961.9.

* cited by examiner

*Primary Examiner* — Octavia Hollington
(74) *Attorney, Agent, or Firm* — Oliff PLC

(57) ABSTRACT

A sensor device includes a partial assembly, a circuit board, and a sensor housing. The partial assembly is constituted by selectively mounting a part that is at least one of a magnetism collection member and a driven wheel to a holder. The circuit board is provided with a detector configured to detect at least one of magnetic flux induced by the magnetism collection member and a rotational angle of the driven wheel in accordance with the part mounted to the holder. The sensor housing is penetrated by the shaft, and houses the partial assembly and the circuit board.

5 Claims, 11 Drawing Sheets

SENSOR DEVICE

CROSS-REFERENCE TO RELATED APPLICATION

This application claims priority to Japanese Patent Application No. 2019-127796 filed on Jul. 9, 2019, incorporated herein by reference in its entirety.

BACKGROUND

1. Technical Field

The present disclosure relates to a sensor device.

2. Description of Related Art

There has hitherto been known a sensor device described in Japanese Unexamined Patent Application Publication No. 2019-074364 (JP 2019-074364 A), for example. This sensor device detects both steering torque applied to a steering wheel and a steering angle that is the rotational angle of a steering shaft coupled to the steering wheel. The sensor device is provided on a pinion shaft that constitutes the steering shaft. The pinion shaft is constituted by coupling an input shaft and an output shaft to each other via a torsion bar.

The sensor device has a permanent magnet fixed to the input shaft and a yoke unit fixed to the output shaft. The yoke unit is constituted by integrating two yokes with each other via a resin portion. When the torsion bar is torsionally deformed with torque applied to the input shaft, the respective relative positions of the permanent magnet and the yokes in the rotational direction are varied. The sensor device detects torque applied to the torsion bar on the basis of variations in magnetic flux of the yokes that accompany variations in the respective relative positions of the permanent magnet and the yokes.

The sensor device includes an external gear that rotates together with the output shaft of the pinion shaft and two driven gears meshed with the external gear. The two driven gears have different numbers of teeth, and therefore the respective rotational angles of the two driven gears during rotation of the external gear differ from each other. The sensor device detects each of the respective rotational angles of the two driven gears, and detects the rotational angle of the output shaft on the basis of the detected rotational angles.

SUMMARY

A sensor housing of the sensor device according to JP 2019-074364 A has a first housing member and a second housing member. The first housing member houses the yoke unit that includes the external gear. The second housing member houses the two driven gears and a circuit board. The circuit board is provided with electronic parts such as magnetic sensors for rotational angle detection and for torque detection. In addition, the second housing member is provided with a tubular connector fitting portion. The connector fitting portion is fitted with a connector for power supply to the circuit board and signal transmission to a controller.

There are wide variations of the sensor device according to the product specifications. For example, it is necessary to prepare a plurality of types of the second housing member in accordance with the requirements about the shape of the connector fitting portion, the direction of fitting the connector with the connector fitting portion, etc. In addition, the second housing member constitutes the appearance of the housing together with the first housing member, and therefore it is necessary to prepare a plurality of variations of both the first housing member and the second housing member in accordance with the requirement about the appearance of the sensor device.

The present disclosure suppresses an increase in the number of variations of constituent parts.

An aspect of the present disclosure provides a sensor device. The sensor device includes a partial assembly, a circuit board, and a sensor housing. The partial assembly is constituted by selectively mounting a part that includes at least one of a magnetism collection member and a driven wheel to a holder. The magnetism collection member is configured to induce magnetic flux that matches torsion of a shaft as a detection target. The driven wheel is configured to rotate in conjunction with rotation of the shaft. The circuit board is provided with a detector configured to detect at least one of the magnetic flux induced by the magnetism collection member and a rotational angle of the driven wheel in accordance with the part mounted to the holder. The sensor housing is penetrated by the shaft, and houses the partial assembly and the circuit board.

With the configuration described above, the partial assembly can be constructed using the same parts, irrespective of the requirement for the sensor device, by selectively changing the parts to be assembled as the partial assembly in accordance with the detection function required for the sensor device. Therefore, an increase in the number of variations of constituent parts of the partial assembly, and hence the sensor device, can be suppressed.

For example, both the magnetism collection member and the driven wheel may be mounted to the holder in the case where the sensor device is required to detect both torque applied to the shaft and the rotational angle of the shaft. Magnetic flux induced by the magnetism collection member matches torsion of the shaft, and therefore torque that acts on the shaft can be calculated on the basis of the magnetic flux. Meanwhile, the driven wheel is rotated in conjunction with rotation of the shaft, and therefore the rotational angle of the shaft can be calculated on the basis of the rotational angle of the driven wheel. Only the magnetism collection member may be mounted to the holder in the case where the sensor device is required to detect only torque applied to the shaft. Meanwhile, only the driven wheel may be mounted to the holder in the case where the sensor device is required to detect only the rotational angle of the shaft.

A requirement about the shape or the material of the sensor housing is also conceivable, and only the shape or the material of the sensor housing may be changed for such a requirement. The same partial assembly to be housed in the sensor housing can be used irrespective of the shape or the material of the sensor housing. Thus, an increase in the number of variations of constituent parts of the sensor device can be suppressed.

In the sensor device described above, the holder may include an engagement portion. The partial assembly may be held inside the sensor housing with the engagement portion engaged with a portion of the sensor housing.

With the configuration described above, the partial assembly can be mounted to the inside of the sensor housing with a single operation. In addition, a fall of the partial assembly from the sensor housing can be suppressed when assembling the sensor device.

In the sensor device described above, the partial assembly may include a holding member that holds the driven wheel on the holder. The holding member may be mounted to the holder so as to cover the driven wheel.

With the configuration described above, the driven wheel is held on the holder by the holding member. Therefore, a fall of the driven wheel from the holder is suppressed. In addition, the partial assembly can be handled easily.

In the sensor device described above, the sensor housing may include a cover that closes an opening portion that opens toward a direction that intersects with an axis of the shaft. The cover may be provided on an assumption that the sensor housing includes a housing chamber that houses the partial assembly and the circuit board via the opening portion.

With the configuration described above, the housing chamber is tightly closed with the opening portion closed by the cover. Therefore, entry of dust or a liquid into the housing chamber is suppressed. In addition, the partial assembly does not have a function as the sensor housing. Therefore, an increase in the number of variations of the holder can be suppressed, unlike the case where the holder of the partial assembly constitutes a part of the sensor housing, for example.

In the sensor device described above, the shaft may be rotated in conjunction with an operation of a steering wheel. This enables torque applied to the shaft to be detected as steering torque applied to the steering wheel, and enables the rotational angle of the shaft to be detected as the steering angle that is the rotational angle of the steering wheel.

With the sensor device according to the present disclosure, an increase in the number of variations of constituent parts can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
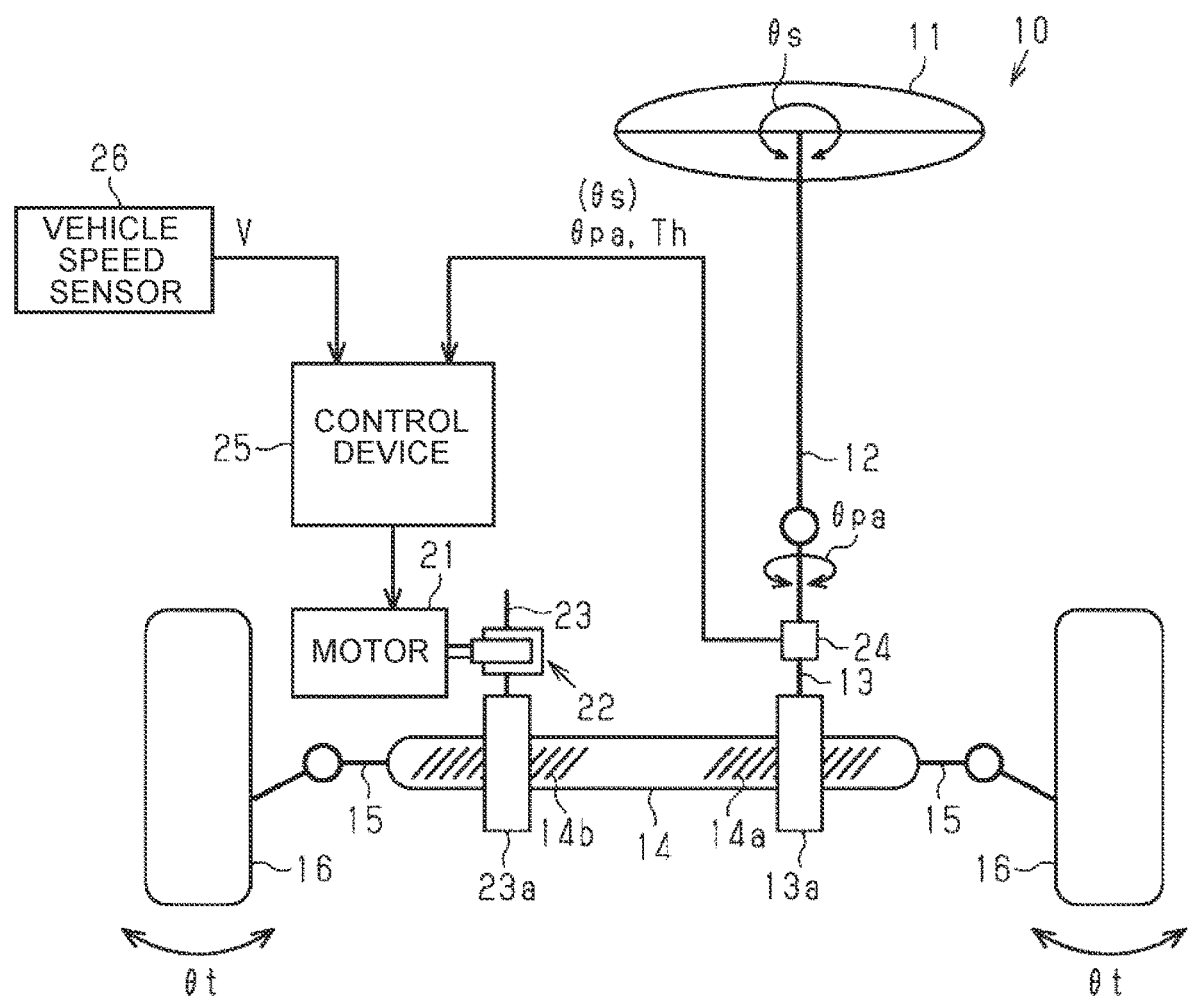
FIG. 1 is a diagram of a steering device that includes a sensor device according to an embodiment.

An embodiment in which a sensor is applied to a steering device of a vehicle will be described below. As illustrated in FIG. 1, a steering device 10 of a vehicle has a steering shaft 12 coupled to a steering wheel 11. A pinion shaft 13 is provided at an end portion of the steering shaft 12 on the opposite side of the steering wheel 11. Pinion teeth 13a of the pinion shaft 13 are meshed with rack teeth 14a of a steered shaft 14 that extends in a direction that intersects with the pinion shaft 13. Right and left steered wheels 16, 16 are coupled to respective ends of the steered shaft 14 via respective tie rods 15, 15.

In addition, the steering device 10 has a motor 21, a speed reduction mechanism 22, a pinion shaft 23, a sensor device 24, and a control device 25 as components for generating a steering assist force (assist force).

The motor 21 is a generation source of the steering assist force, and may be a three-phase brushless motor, for example. The motor 21 is coupled to the pinion shaft 23 via the speed reduction mechanism 22. Pinion teeth 23a of the pinion shaft 23 are meshed with rack teeth 14b of the steered shaft 14. Rotation of the motor 21 is reduced in speed by the speed reduction mechanism 22. A rotational force at the reduced speed is transmitted from the pinion shaft 23 to the pinion shaft 13 via the steered shaft 14 as the steering assist force.

The sensor device 24 is provided on the pinion shaft 13 (specifically, a gear housing that houses the pinion shaft 13 together with the steered shaft 14). The sensor device 24 is constituted by combining a torque sensor and a rotational angle sensor. The sensor device 24 detects, as steering torque Th, torque applied to the pinion shaft 13 through an operation to rotate the steering wheel 11. The sensor device 24 also detects, as a steering angle θs, a rotational angle θpa of the pinion shaft 13 for multiple rotations exceeding 360 degrees.

The control device 25 retrieves the steering torque Th and the steering angle θs that are detected by the sensor device 24. The control device 25 also retrieves a vehicle speed V detected by a vehicle speed sensor 26 provided in the vehicle. The control device 25 executes assist control for generating a steering assist force that matches the steering torque Th and the vehicle speed V through energization control performed on the motor 21. The control device 25 controls power supply to the motor 21 on the basis of the steering torque Th that is detected by the sensor device 24 and the vehicle speed V that is detected by the vehicle speed sensor 26.

Figure 2:
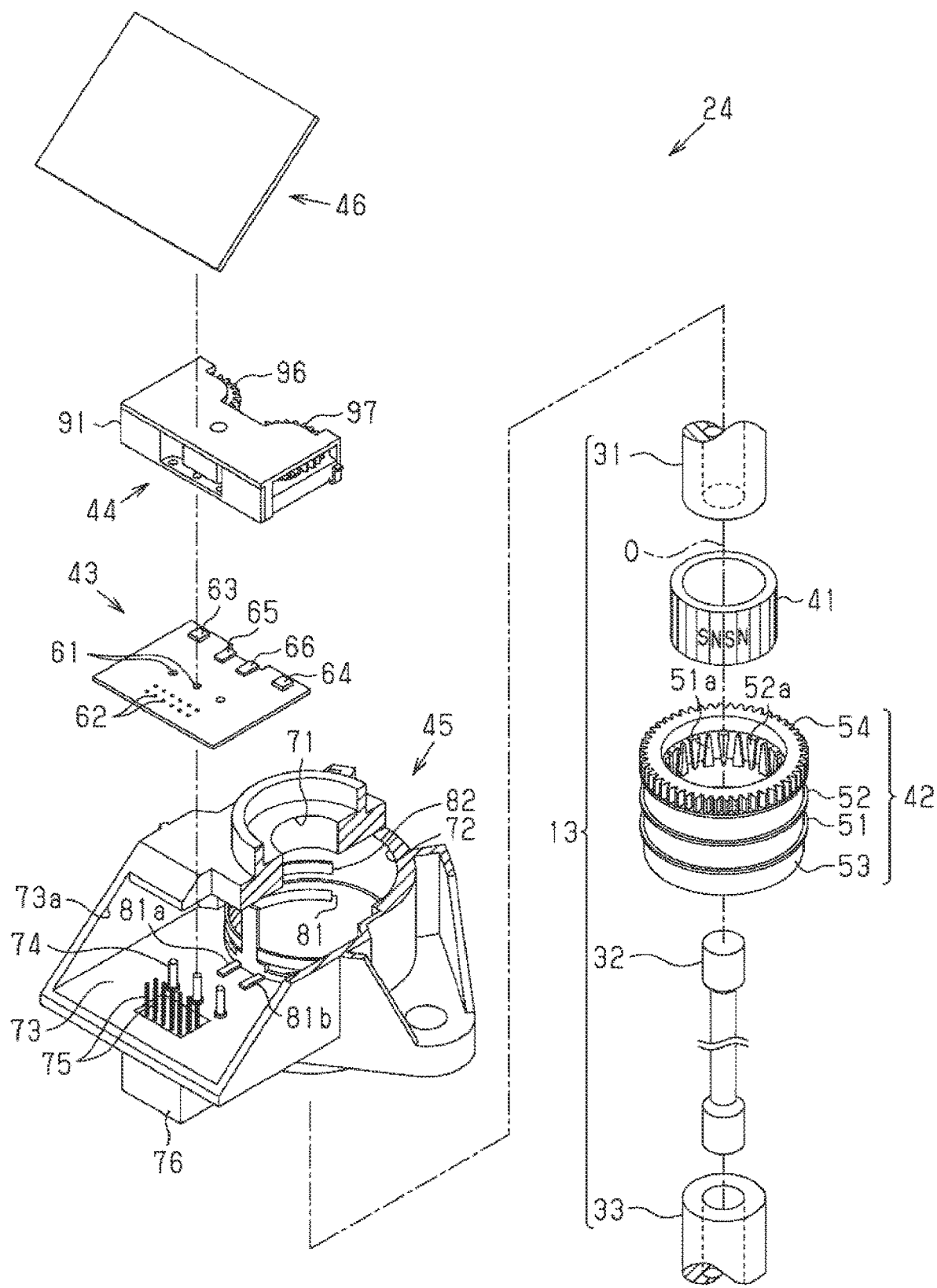
FIG. 2 is a perspective view of the sensor device according to the embodiment as exploded.

Next, the pinion shaft 13 and the sensor device 24 will be described. As illustrated in FIG. 2, the pinion shaft 13 has an input shaft 31, a torsion bar 32, and an output shaft 33. The input shaft 31 and the output shaft 33 are coupled to each other via the torsion bar 32. The input shaft 31, the torsion bar 32, and the output shaft 33 are positioned coaxially on the axis O.

The sensor device 24 has a permanent magnet 41, a magnetic yoke 42, a circuit board 43, a partial assembly 44, a sensor housing 45, and a cover 46. The permanent magnet 41 has a cylindrical shape. The permanent magnet 41 has S poles and N poles arranged alternately along the circumferential direction thereof. The permanent magnet 41 is fixed to the input shaft 31.

The magnetic yoke 42 has a cylindrical shape. The permanent magnet 41 is inserted into the magnetic yoke 42. The magnetic yoke 42 is formed by molding two annular yokes 51, 52, which are magnetic bodies, with a synthetic resin material. A portion of the magnetic yoke 42 formed from the synthetic resin material functions as a holder 53 that holds the positional relationship between the two yokes 51, 52. A main driving gear 54 is integrally molded at an end portion of the holder 53. The two yokes 51, 52 are arranged along the direction along the axis O of the pinion shaft 13. The magnetic yoke 42 is fixed to the output shaft 33.

The two yokes 51, 52 are provided with a plurality of tooth portions 51a, 52a, respectively, at equal intervals along the circumferential direction. The tooth portions 51a, 52a extend toward opposite sides with respect to each other in the direction along the axis O of the pinion shaft 13. The two yokes 51, 52 are held such that the respective tooth portions 51a, 52a are positioned alternately in the circumferential direction. The two yokes 51, 52 are provided such that the respective centers of the plurality of tooth portions 51a, 52a in the circumferential direction coincide with the boundaries between the N poles and the S poles of the permanent magnet 41 with the torsion bar 32 not torsionally deformed.

The circuit board 43 has a rectangular shape. Three support holes 61 are provided in line near the center of the circuit board 43. The circuit board 43 is also provided with a plurality of terminal connection holes 62. The terminal connection holes 62 are arranged in two lines along one of the two long side edges of the circuit board 43. In addition, two magnetic sensors 63, 64, which are detectors for angle detection, and two magnetic sensors 65, 66, which are detectors for torque detection, are provided on one (upper surface in FIG. 2) of two surfaces of the circuit board 43 positioned on the opposite sides with respect to each other. The magnetic sensors 63, 64 and the magnetic sensors 65, 66 are arranged in line along the long side edge of the circuit board 43 on the opposite side of the long side edge along which the terminal connection holes 62 are arranged. The two magnetic sensors 65, 66 for torque detection are positioned between the two magnetic sensors 63, 64 for angle detection in a direction in which such magnetic sensors are arranged. The magnetic sensors 63, 64 for angle detection may be magnetoresistive (MR) sensors, for example. The magnetic sensors 65, 66 for torque detection may be Hall sensors, for example.

The partial assembly 44 is formed by attaching a part for detection of the rotational angle of the pinion shaft 13 and a part for detection of torque applied to the pinion shaft 13 to a holder 91 so as to be able to be collectively handled. The configuration and the assembly procedure of the partial assembly 44 will be discussed in detail later.

The sensor housing 45 is integrally molded from a synthetic resin material. The sensor housing 45 has a tubular shape that opens toward a direction that intersects with the axis O of the pinion shaft 13. The sensor housing 45 is penetrated by the pinion shaft 13. In addition, the sensor housing 45 houses therein the permanent magnet 41 and the magnetic yoke 42, which are provided on the pinion shaft 13, and the circuit board 43 and the partial assembly 44.

The sensor housing 45 has a circular insertion hole 71, a tubular first housing chamber 72, and a second housing chamber 73. The insertion hole 71, the first housing chamber 72, and the second housing chamber 73 communicate with each other. The inside diameter of the insertion hole 71 is set to be slightly larger than the outside diameter of the pinion shaft 13. The inside diameter of the first housing chamber 72 is set to be slightly larger than the outside diameter of the magnetic yoke 42. The insertion hole 71 and the first housing chamber 72 are positioned coaxially on the axis O. The second housing chamber 73 opens toward a direction that intersects with the axis O of the pinion shaft 13. An opening portion 73a of the second housing chamber 73, and hence the sensor housing 45, is closed by the cover 46.

Three support projecting portions 74 in a stepped circular column shape are provided on the inner bottom surface of the second housing chamber 73. The three support projecting portions 74 are arranged in line along the width direction of the second housing chamber 73 that is orthogonal to the axis O. The three support projecting portions 74 correspond to the three support holes 61 that are provided in the circuit board 43.

In addition, a plurality of terminals 75 are provided to project from the inner bottom surface of the second housing chamber 73. The plurality of terminals 75 are positioned on the outer side with respect to the support projecting portions 74 in the opening direction of the second housing chamber 73. The plurality of terminals 75 are arranged in two lines along the width direction of the second housing chamber 73. The plurality of terminals 75 correspond to the plurality of terminal connection holes 62 that are provided in the circuit board 43.

In addition, a connector fitting portion 76 in a rectangular tube shape is provided on the outer bottom surface of the second housing chamber 73. The connector fitting portion 76 extends along the axis O of the pinion shaft 13. The plurality of terminals 75 penetrate the bottom wall of the second housing chamber 73 to be exposed to the inside of the connector fitting portion 76. The connector fitting portion 76 is fitted with a connector of wiring that electrically connects between the terminals 75 of the circuit board 43 and the control device 25.

In the sensor housing 45, in addition, two magnetism collection rings 81, 82 in a C-shape are provided on the inner peripheral surface of the first housing chamber 72. The magnetism collection rings 81, 82 are arranged in the direction along the axis O of the pinion shaft 13. The magnetism collection ring 81 corresponds to the yoke 51. The magnetism collection ring 82 corresponds to the yoke 52. The magnetism collection ring 82 is provided with two magnetism collection projecting portions 81a, 81b. The magnetism collection projecting portions 81a, 81b are exposed to the inside of the second housing chamber 73.

Figure 3:
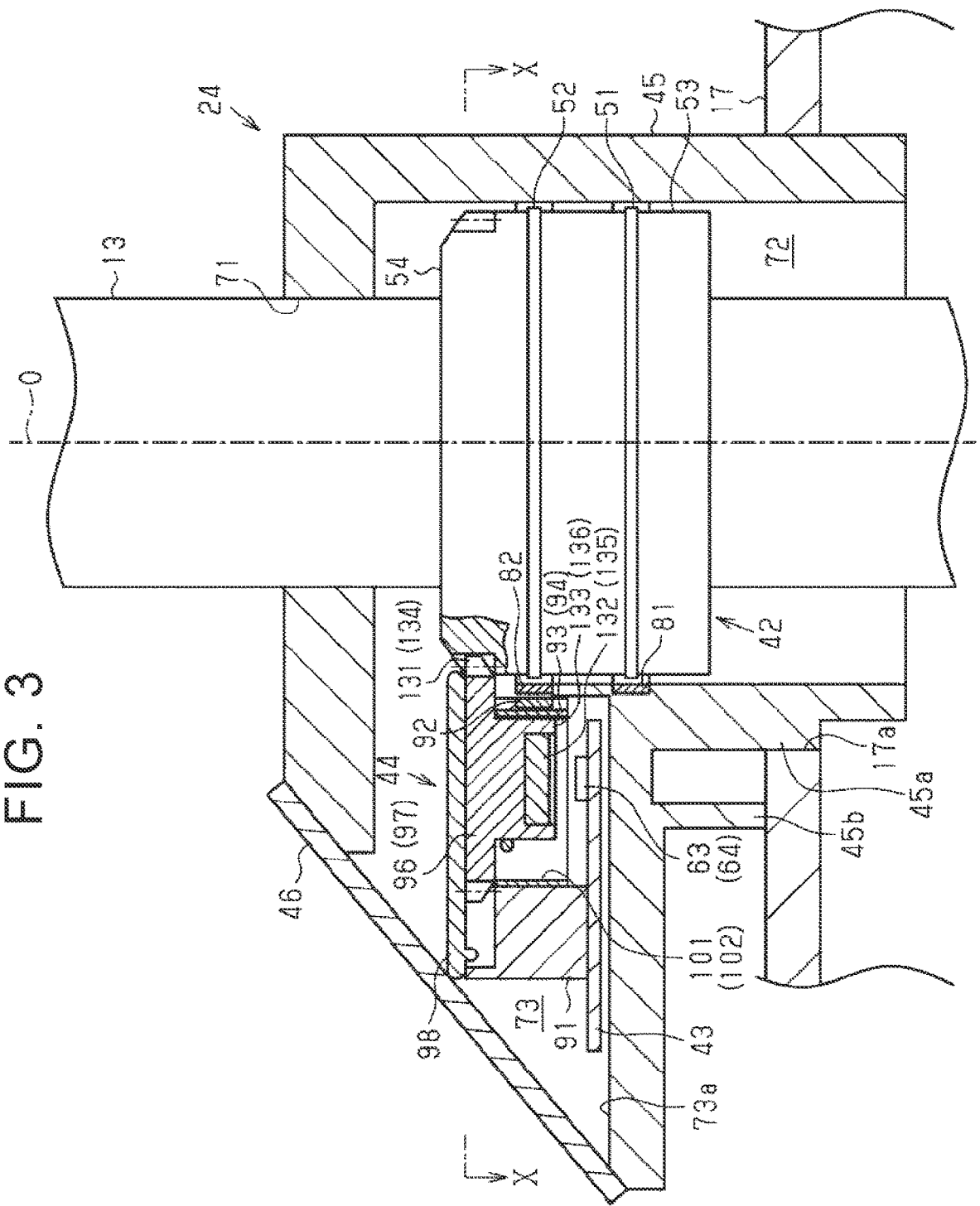
FIG. 3 is a sectional view of the sensor device according to the embodiment taken along the axial direction.

As illustrated in FIG. 3, the sensor housing 45 is attached to a gear housing 17 that houses the steered shaft 14. The first housing chamber 72 houses the magnetic yoke 42 that is attached to the pinion shaft 13. Meanwhile, the second housing chamber 73 houses the circuit board 43 and the partial assembly 44. The assembly procedure for the sensor device 24 will be discussed in detail later.

Figure 4:
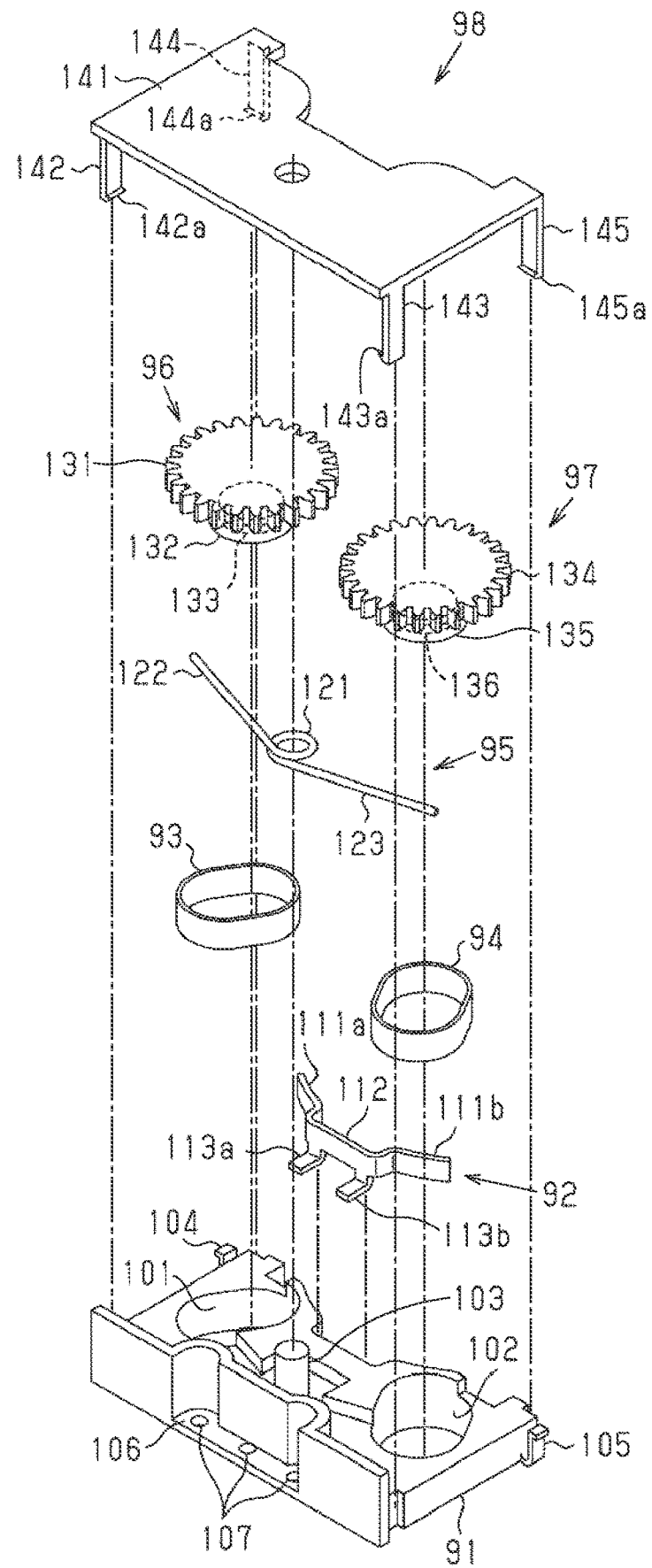
FIG. 4 is a perspective view of a partial assembly according to the embodiment as exploded.

Next, the partial assembly 44 will be described in detail. As illustrated in FIG. 4, the partial assembly 44 has the holder 91, a core 92 that serves as a magnetism collection member, two magnetic shields 93, 94, a torsion coil spring 95, two driven gears 96, 97 that serve as driven wheels, and a gear stopper 98 that serves as a holding member.

The holder 91 is integrally molded from a synthetic resin material. The holder 91 has a rectangular plate shape as a whole. The holder 91 has two support holes 101, 102. The support holes 101, 102 are arranged along the direction of the long sides of the holder 91. The support holes 101, 102 are so-called long holes. The support holes 101, 102 are provided so as to extend along the radial direction of the main driving gear 54 that is provided in the magnetic yoke 42, and so as to be more away from each other at a location more away from the main driving gear 54, with the sensor device 24 assembled.

In addition, the holder 91 is provided with a support portion 103 in a circular column shape. The support portion 103 is provided on one (upper surface in FIG. 4) of two surfaces of the holder 91 positioned on the opposite sides with respect to each other in the direction of penetration of the support holes 101, 102. The support portion 103 is positioned between the two support holes 101, 102 in the direction of the long sides of the holder 91.

The holder 91 is also provided with two engagement projecting portions 104, 105 that serve as engagement portions. The engagement projecting portions 104, 105 are provided on two short side surfaces of the holder 91 positioned on the opposite sides with respect to each other in the direction of the long sides of the holder 91. The engagement projecting portions 104, 105 are provided in correspondence with two corner portions, of the four corners of the holder 91, positioned on the opposite sides with respect to each other in the direction of the long sides of the holder 91. The engagement projecting portions 104, 105 have the shape of a U-shaped plate.

The holder 91 is also provided with a thin-walled portion 106. The thin-walled portion 106 is provided at a portion of the holder 91 on the opposite side of the engagement projecting portions 104, 105 in the direction of the short sides of the holder 91. The thin-walled portion 106 is positioned at the middle in the direction of the long sides of the holder 91. The thickness of the thin-walled portion 106 is set to be smaller than that of the other portions of the holder 91. The thin-walled portion 106 is provided with three fixation holes 107. The three fixation holes 107 are arranged along the direction of the long sides of the holder 91. The three fixation holes 107 correspond to the three support holes 61 of the circuit board 43.

The core 92 is provided integrally with the holder 91 by resin molding. The core 92 is formed by plastically deforming a single metal plate material. The core 92 has two arm portions 111a, 111b, a coupling portion 112, and two magnetism collection projecting portions 113a, 113b. The two arm portions 111a, 111b have an arcuate surface shape. The two arm portions 111a, 111b are curved along the outer peripheral surface of the magnetism collection ring 82 with the sensor device 24 assembled. The coupling portion 112 couples the two arm portions 111a, 111b to each other, and has a rectangular plate shape. The two magnetism collection projecting portions 113a, 113b are provided on the coupling portion 112. The two magnetism collection projecting portions 113a, 113b extend toward the opposite direction of the two arm portions 111a, 111b. The two magnetism collection projecting portions 113a, 113b are arranged along a direction in which the coupling portion 112 extends.

The two magnetic shields 93, 94 are provided integrally with the holder 91 by resin molding. The two magnetic shields 93, 94 are provided on the respective inner peripheral surfaces of the two support holes 101, 102 of the holder 91. The magnetic shields 93, 94 are made of a metal material and has a tubular shape along the respective inner peripheral surfaces of the support holes 101, 102.

The torsion coil spring 95 is mounted to the holder 91. The torsion coil spring 95 has a coil portion 121, a first arm portion 122, and a second arm portion 123. The coil portion 121 is fitted with the support portion 103 of the holder 91. The respective lengths of the first arm portion 122 and the second arm portion 123 are set to such lengths that the respective distal ends of the first arm portion 122 and the second arm portion 123 face the two support holes 101, 102 of the holder 91 in the axial direction of the support holes 101, 102 with the coil portion 121 fitted with the support portion 103 of the holder 91.

The driven gear 96 has a gear portion 131 in a circular plate shape, a shaft portion 132 in a circular column shape, and a permanent magnet 133 in a circular plate shape. The gear portion 131 and the shaft portion 132 are made of a synthetic resin material and are molded integrally with each other. The outside diameter of the shaft portion 132 is set to be smaller than the outside diameter of the gear portion 131. The gear portion 131 and the shaft portion 132 are coaxially positioned. The permanent magnet 133 is embedded in an end portion of the shaft portion 132 on the opposite side of the gear portion 131. The permanent magnet 133 is provided integrally with the gear portion 131 and the shaft portion 132 by resin molding. As with the driven gear 96, the driven gear 97 has a gear portion 134, a shaft portion 135, and a permanent magnet 136. The permanent magnet 136 is embedded in an end portion of the shaft portion 135 on the opposite side of the gear portion 134. The shaft portion 132 of the driven gear 96 is inserted into the support hole 101 of the holder 91. The shaft portion 135 of the driven gear 97 is inserted into the support hole 102 of the holder 91. The gear portions 131, 134 are supported so as to be slidable and rotatable with respect to a surface (upper surface in FIG. 4) of the holder 91 on the side on which the support portion 103 is provided, with the shaft portions 132, 135 inserted into the support holes 101, 102, respectively. The respective numbers of teeth of the gear portions 131, 134 are different from each other.

The gear stopper 98 is made of a synthetic resin material and has a flat plate shape. The gear stopper 98 is attached to the holder 91. The gear stopper 98 covers the two driven gears 96, 97 and the torsion coil spring 95 that are mounted to the holder 91. The gear stopper 98 has a retaining portion 141 in a rectangular plate shape and four engagement lugs 142, 143, 144, 145. The four engagement lugs 142 to 145 are provided at the four corners of the retaining portion 141. In addition, the four engagement lugs 142 to 145 extend along a direction that is orthogonal to the retaining portion 141. Engagement projecting portions 142a, 143a, 144a, 145a are provided at the respective distal ends of the four engagement lugs 142 to 145. The four engagement projecting portions 142a to 145a are engageable with the four corners of a surface of the holder 91 on the opposite side of the gear stopper 98.

Assembly Procedure for Partial Assembly

Next, the assembly procedure for the partial assembly 44 will be described. It should be noted, however, that the core 92 and the magnetic shields 93, 94 are provided integrally with the holder 91 by resin molding.

To assemble the partial assembly 44, first, the torsion coil spring 95 is attached to the holder 91 by fitting the coil portion 121 of the torsion coil spring 95 with the support portion 103 of the holder 91. Next, the shaft portions 132, 135 of the two driven gears 96, 97 are inserted into the two support holes 101, 102 of the holder 91, respectively. Consequently, the two driven gears 96, 97 are supported so as to be rotatable relative to the holder 91. After that, the gear stopper 98 is attached to the holder 91 from the driven gears 96, 97 side.

Figure 5A:
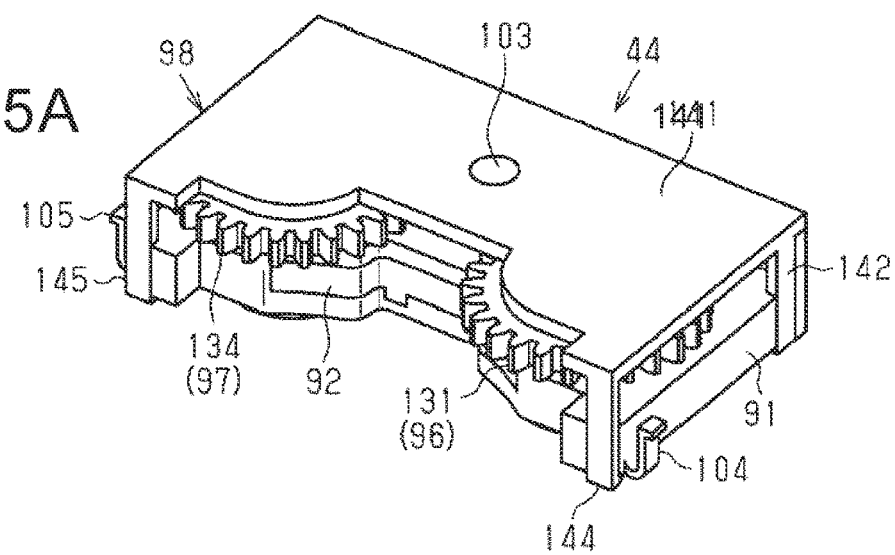
FIG. 5A is a perspective view of the partial assembly according to the embodiment.
Figure 5B:
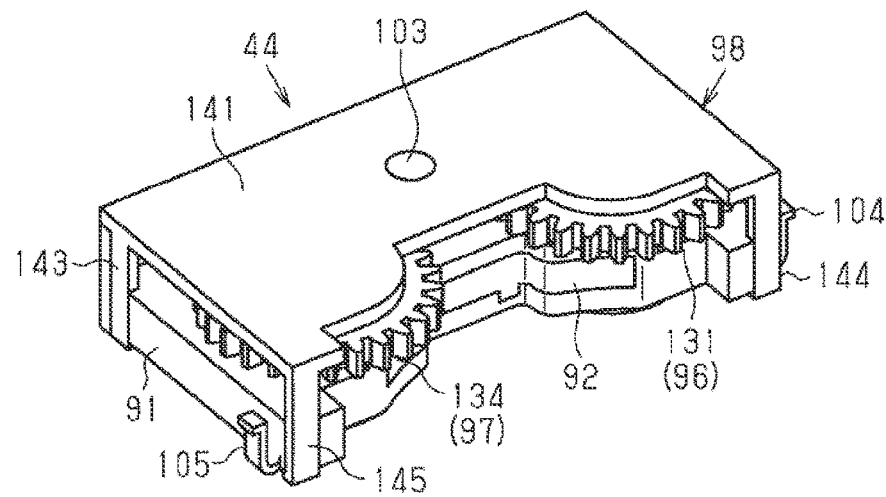
FIG. 5B is another perspective view of the partial assembly according to the embodiment.
Figure 5C:
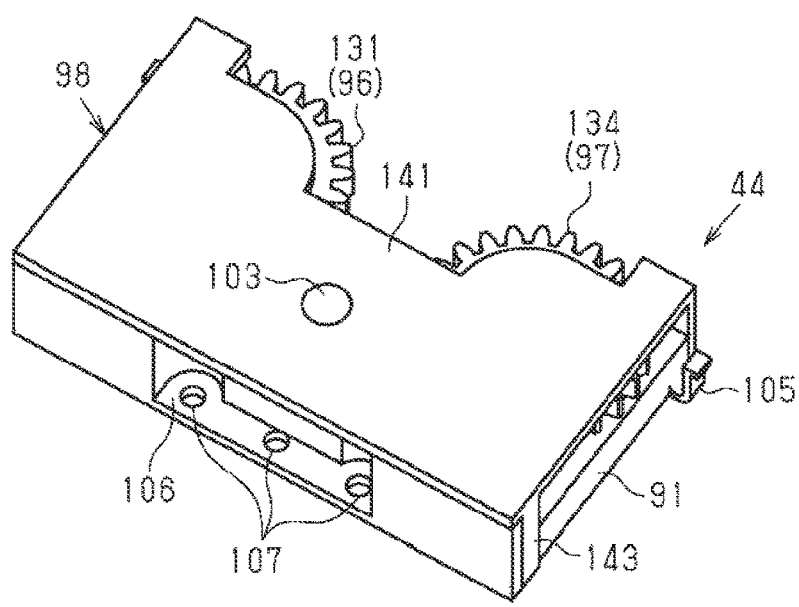
FIG. 5C is still another perspective view of the partial assembly according to the embodiment.

As illustrated in FIGS. 5A, 5B, and 5C, the four engagement lugs 142 to 145 of the gear stopper 98 are engaged with the four corners of a surface of the holder 91 on the opposite side of the gear stopper 98 so as to regulate movement of the gear stopper 98 toward a direction in which the gear stopper 98 is to be detached from the holder 91 at the timing when the retaining portion 141 of the gear stopper 98 contacts the respective gear portions 131, 134 of the driven gears 96, 97. Consequently, the gear stopper 98 is fixed to the holder 91. In addition, the driven gears 96, 97 are held by the holder 91.

The assembly work for the partial assembly 44 is completed as described above. As illustrated in FIGS. 5A, 5B, and 5C, the torsion coil spring 95 and the two driven gears 96, 97 are maintained in the state of being covered by the retaining portion 141 with the partial assembly 44 assembled. Movement of the two driven gears 96, 97 toward a direction (upward in FIGS. 5A, 5B, and 5C) away from the holder 91 is regulated with the gear portions 131, 134 abutting against the retaining portion 141 of the gear stopper 98. The driven gears 96, 97 are slidable and rotatable with respect to the retaining portion 141 of the gear stopper 98 via the gear portions 131, 134.

As illustrated in FIG. 5C, the two driven gears 96, 97 slightly protrude from a side edge portion of the gear stopper 98 on the opposite side of the thin-walled portion 106 of the holder 91. As illustrated in FIGS. 5A and 5B, in addition, the core 92 is exposed from one of the two long side surfaces of the holder 91 on the opposite side of the thin-walled portion 106 with the partial assembly 44 assembled.

Figure 6:
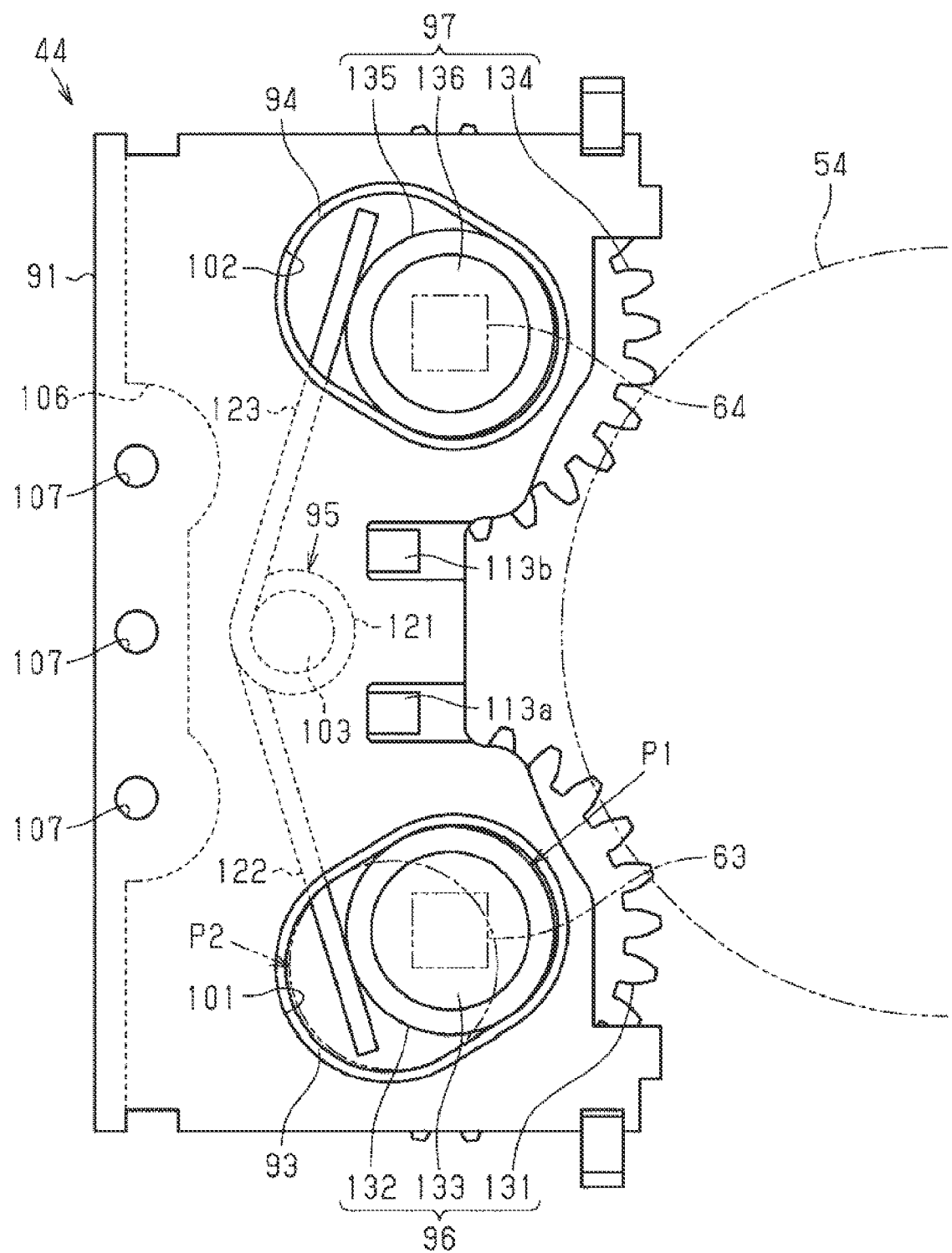
FIG. 6 is a bottom view of the partial assembly according to the embodiment as seen from the opposite side of a gear stopper.

As illustrated in FIG. 6, the driven gears 96, 97 are movable along the support holes 101, 102, respectively, with the partial assembly 44 assembled. The driven gears 96, 97 are movable between a first position P1 and a second position P2 in the support holes 101, 102, respectively. The first position P1 is a position at which the shaft portions 132, 135 are engaged with a first end portion of the support holes 101, 102, which is an end portion on the side closer to the main driving gear 54, via the magnetic shields 93, 94, respectively. The second position P2 is a position at which the shaft portions 132, 135 are engaged with a second end portion of the support holes 101, 102, which is an end portion on the side farther from the main driving gear 54, via the magnetic shields 93, 94, respectively.

In addition, the first arm portion 122 of the torsion coil spring 95 is engaged with a portion of the shaft portion 132 of the driven gear 96 on the opposite side of the main driving gear 54 with the partial assembly 44 assembled. The second arm portion 123 is engaged with a portion of the shaft portion 135 of the driven gear 97 on the opposite side of the main driving gear 54. The driven gears 96, 97 are always biased toward an end portion of the support holes 101, 102, respectively, on the side closer to the main driving gear 54 by the elastic force of the torsion coil spring 95. Movement of the driven gears 96, 97 toward the first position P1 is regulated with the shaft portions 132, 135 engaged with an end portion of the support holes 101, 102 on the side closer to the main driving gear 54 via the magnetic shields 93, 94, respectively. The two magnetism collection projecting portions 113a, 113b of the core 92 are exposed from a side surface of the holder 91 on the opposite side of the gear stopper 98. The two magnetism collection projecting portions 113a, 113b are positioned between the two support holes 101, 102 of the holder 91.

Supplemental Description of Sensor Housing

Figure 7:
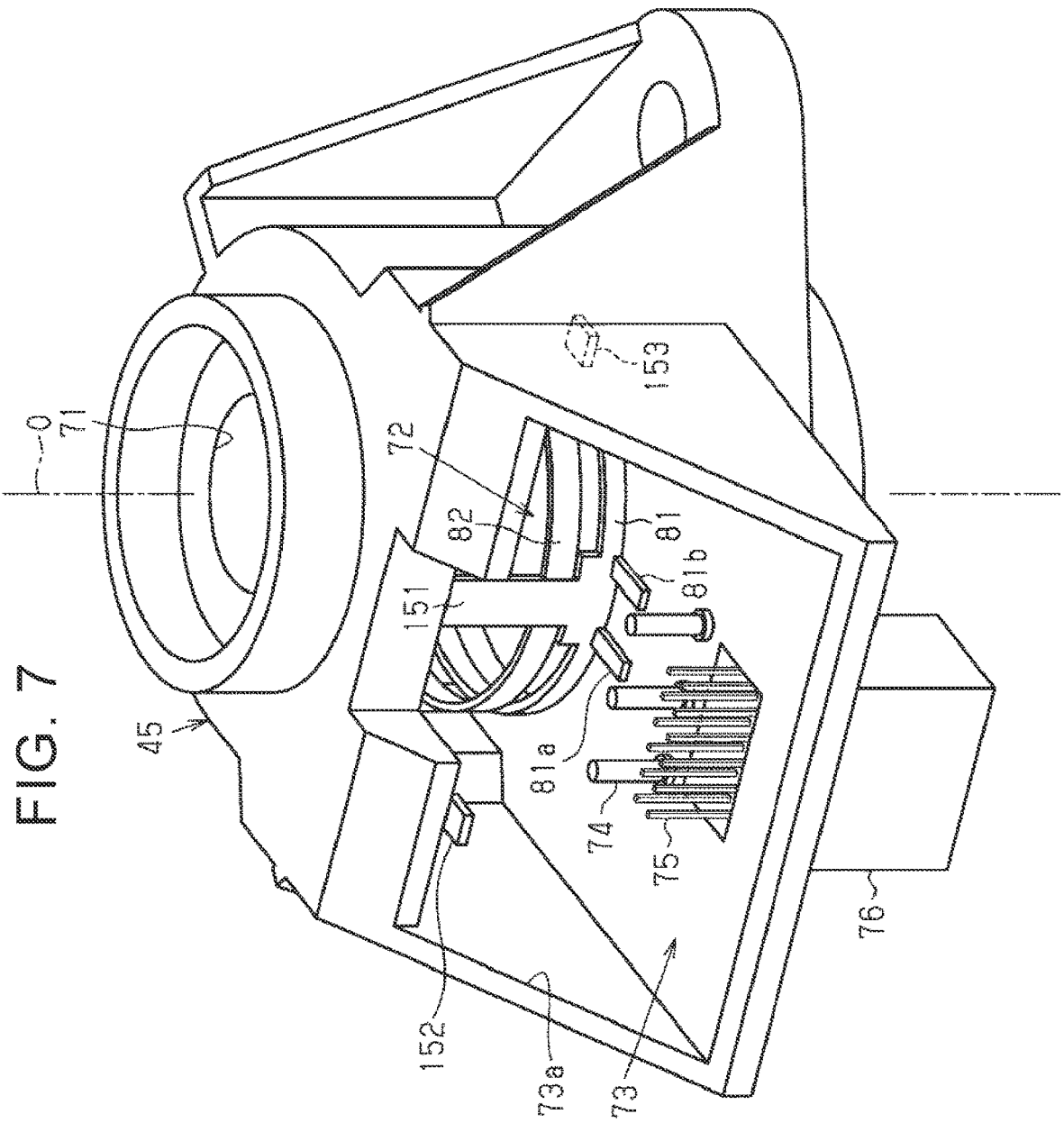
FIG. 7 is a perspective view of a sensor housing according to the embodiment as seen from the opening portion side.

Some supplemental description is made of the sensor housing 45. As illustrated in FIG. 7, a reinforcement member 151 in a rectangular plate shape is provided inside the sensor housing 45. The reinforcement member 151 is positioned at the boundary portion between the first housing chamber 72 and the second housing chamber 73 inside the sensor housing 45. In addition, the reinforcement member 151 is positioned at the middle in the width direction of the second housing chamber 73 as the sensor housing 45 is seen from the opening portion 73a side. The term "width direction" refers to the direction of the frontage of the opening portion 73a that is orthogonal to the axis O of the pinion shaft 13. The reinforcement member 151 is provided in such a manner as to couple two inner wall surfaces of the second housing chamber 73 that oppose each other in the direction along the axis O of the pinion shaft 13.

In addition, two engagement projecting portions 152, 153 are provided inside the second housing chamber 73 of the sensor housing 45. The engagement projecting portions 152, 153 are provided on the two respective inner side surfaces of the second housing chamber 73 that oppose each other in a direction that is orthogonal to the axis O of the pinion shaft 13. The engagement projecting portions 152, 153 are provided to hold the partial assembly 44, which is inserted into the second housing chamber 73 via the opening portion 73a, inside the second housing chamber 73, and correspond to the engagement projecting portions 104, 105, respectively, which are provided on the holder 91 of the partial assembly 44.

Assembly Procedure for Sensor Device

Next, the assembly procedure for the sensor device 24 will be described. It should be noted, however, that the partial assembly 44 has already been assembled. In addition, the magnetic yoke 42 has been attached to the pinion shaft 13.

To assemble the sensor device 24, as illustrated in FIG. 2 mentioned earlier, first, the circuit board 43 is attached to the inside of the second housing chamber 73 via the opening portion 73a of the sensor housing 45. It should be noted, however, that the circuit board 43 is attached to the inner bottom surface of the second housing chamber 73 in such a posture that the two magnetic sensors 63, 64 for angle detection and the two magnetic sensors 65, 66 for torque detection face the opposite side (upper side in FIG. 2) of the inner bottom surface of the second housing chamber 73.

At this time, the support holes 61 of the circuit board 43 are penetrated by the respective support projecting portions 74 that are provided on the inner bottom surface of the second housing chamber 73. At this time, in addition, the terminal connection holes 62 of the circuit board 43 are penetrated by the respective terminals 75 that project from the inner bottom surface of the second housing chamber 73. Then, soldering etc. is performed with the terminals 75 inserted into the respective terminal connection holes 62 of the circuit board 43. Consequently, a wiring pattern (not illustrated) on the circuit board 43 and the terminals 75 are electrically connected to each other.

Next, the partial assembly 44 is mounted to the inside of the second housing chamber 73 via the opening portion 73a of the sensor housing 45. At this time, the partial assembly 44 is attached to the inside of the second housing chamber 73 in such a manner as to be stacked on the circuit board 43 while maintaining the driven gears 96, 97 in such a posture as to face the first housing chamber 72 side of the sensor housing 45.

Figure 8:
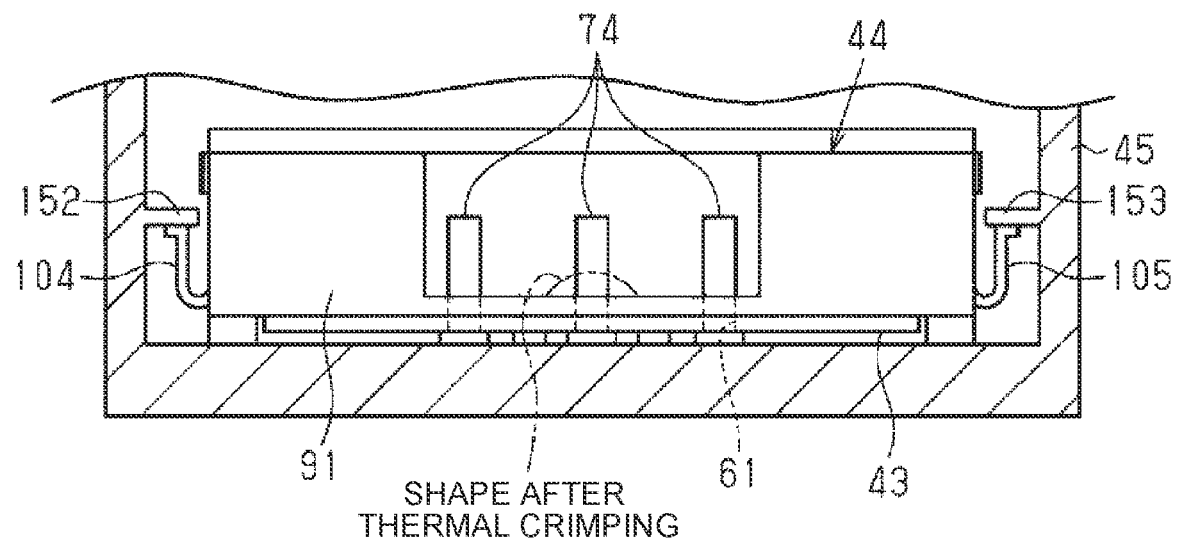
FIG. 8 is a side sectional view of the sensor housing according to the embodiment as seen from the opening portion side, illustrating an essential portion.

When mounting the partial assembly 44 to the inside of the second housing chamber 73, as illustrated in FIG. 8, the two engagement projecting portions 104, 105, which are provided on the holder 91 of the partial assembly 44, are engaged with the two engagement projecting portions 152, 153, which are provided inside the second housing chamber 73, so as to regulate movement of the partial assembly 44 in a direction (upward direction in FIG. 8) away from the circuit board 43. Consequently, movement of the partial assembly 44 in a direction away from the circuit board 43 is regulated. In addition, the respective distal end portions of the support projecting portions 74 that penetrate the support holes 61 of the circuit board 43 are inserted into the fixation holes 107 that are provided in the thin-walled portion 106 of the partial assembly 44. Consequently, the partial assembly 44 is positioned inside the second housing chamber 73.

Thermal crimping is applied to the respective distal end portions of the support projecting portions 74 that penetrate the fixation holes 107 of the partial assembly 44 with the partial assembly 44 held inside the second housing chamber 73 via the two engagement projecting portions 104, 105 and the support projecting portions 74 as described above. That is, the support projecting portions 74 that penetrate the fixation holes 107 of the partial assembly 44 are plastically deformed to be crimped by heating and pressurizing at the same time the respective distal end portions of the support projecting portions 74 using a die that has been heated by a heater, for example. Consequently, the partial assembly 44 is fixed inside the second housing chamber 73.

Figure 9:
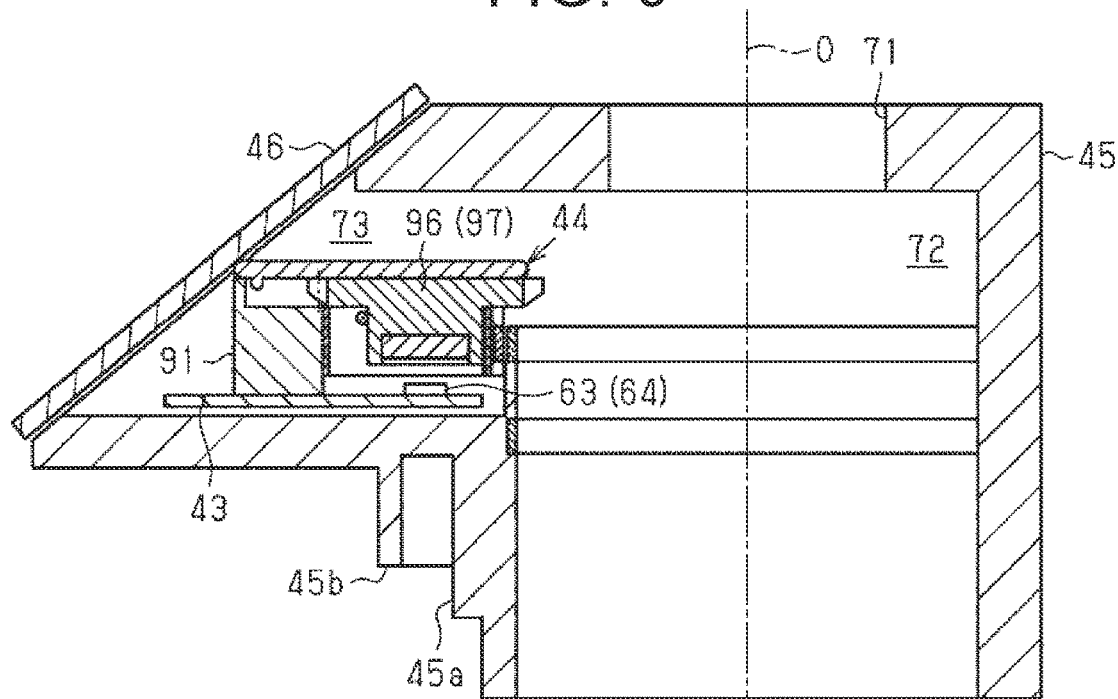
FIG. 9 is a sectional view of the sensor device according to the embodiment as exploded into the sensor housing and a magnetic yoke.
Figure 9:
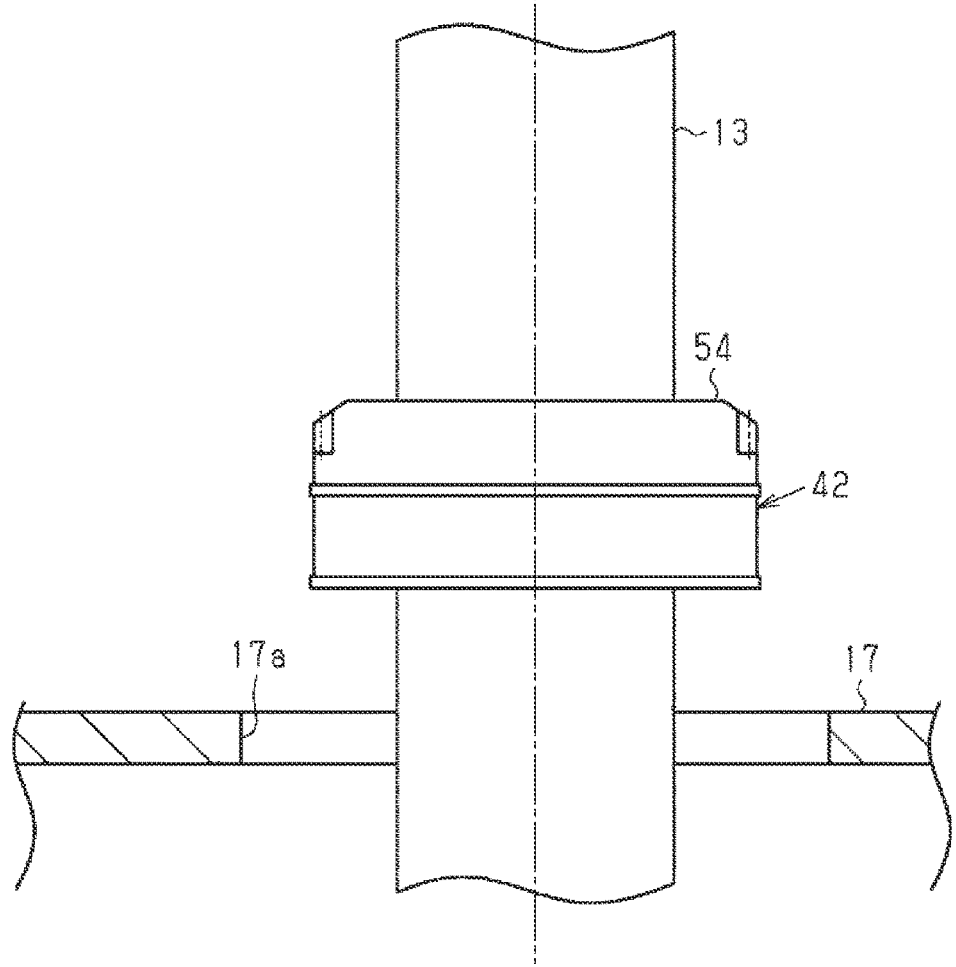

Next, as illustrated in FIG. 9, the opening portion 73a of the sensor housing 45 is closed by the cover 46. The cover 46 is fixed to the sensor housing 45 by laser welding, for example. After that, the sensor housing 45 to which the circuit board 43, the partial assembly 44, and the cover 46 are attached is attached to the pinion shaft 13 to which the magnetic yoke 42 is attached. It should be noted, however, that the sensor housing 45 is fitted with the pinion shaft 13 from the first housing chamber 72 side. Accordingly, the driven gears 96, 97 are gradually moved closer to the main driving gear 54, which is provided on the magnetic yoke 42, in the direction along the axis O of the pinion shaft 13. As illustrated in FIG. 3 mentioned earlier, a bottom portion 45a of the sensor housing 45 is fitted with an attachment hole 17a of the gear housing 17, and a stepped portion 45b of the sensor housing 45 provided at the peripheral edge portion of the bottom portion 45a abuts against the peripheral edge portion of the attachment hole 17a of the gear housing 17. At this timing, in addition, the teeth of the driven gears 96, 97 and the teeth of the main driving gear 54 are meshed with each other. The sensor housing 45 is fixed to the gear housing 17 by inserting a bolt into a fastening portion of the sensor housing 45 in this state and fastening the sensor housing 45 to the gear housing 17.

The assembly work for the sensor device 24 is completed as described above.

Positional Relationship Between Driven Gears and Main Driving Gear

Next, the positional relationship between the driven gears 96, 97 and the main driving gear 54 with the sensor device 24 assembled will be described.

Figure 10:
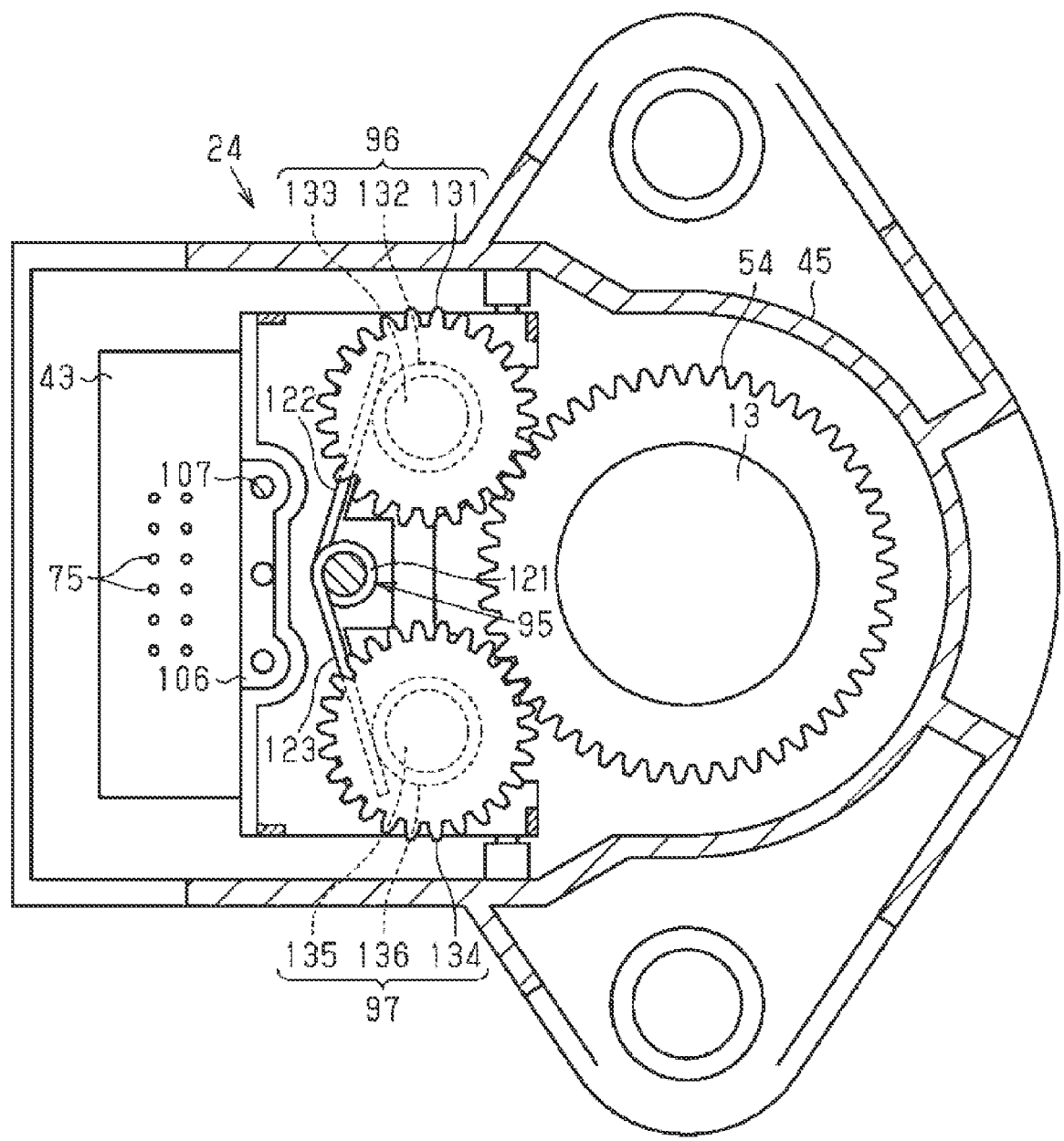
FIG. 10 is a sectional view of the sensor housing alone taken along the line X-X in FIG. 3.

As illustrated in FIG. 10, the two driven gears 96, 97 are meshed with the main driving gear 54 with the sensor device 24 assembled. Therefore, when the pinion shaft 13 is rotated, the main driving gear 54 is also rotated together, and accordingly the two driven gears 96, 97 are also rotated. In addition, the respective numbers of teeth of the two driven gears 96, 97 are different from each other. Therefore, in the case where the main driving gear 54 is rotated in conjunction with rotation of the pinion shaft 13, the respective rotational angles of the two driven gears 96, 97 with respect to the rotational angle of the main driving gear 54 are different from each other.

Positional Relationship Between Driven Gears and Magnetic Sensors

Next, the positional relationship between the permanent magnets 133, 136 of the driven gears 96, 97 and the magnetic sensors 63, 64 for angle detection with the sensor device 24 assembled will be described.

As illustrated in FIG. 3, the permanent magnets 133, 136, which are provided in the driven gears 96, 97, face the magnetic sensors 63, 64 for angle detection, which are provided on the circuit board 43, in the direction along the axis O of the pinion shaft 13 with the sensor device 24 assembled. The magnetic sensors 63, 64 generate electric signals that match changes in the magnetic field that accompany rotation of the driven gears 96, 97, respectively. The control device 25 detects, as the steering angle θs, the rotational angle θpa of the pinion shaft 13 on the basis of the electric signals that are generated by the magnetic sensors 63, 64.

Positional Relationship Among Yokes, Magnetism Collection Rings, and Core

Next, the positional relationship among the two yokes 51, 52, the two magnetism collection rings 81, 82, and the core 92 with the sensor device 24 assembled will be described.

Figure 11:
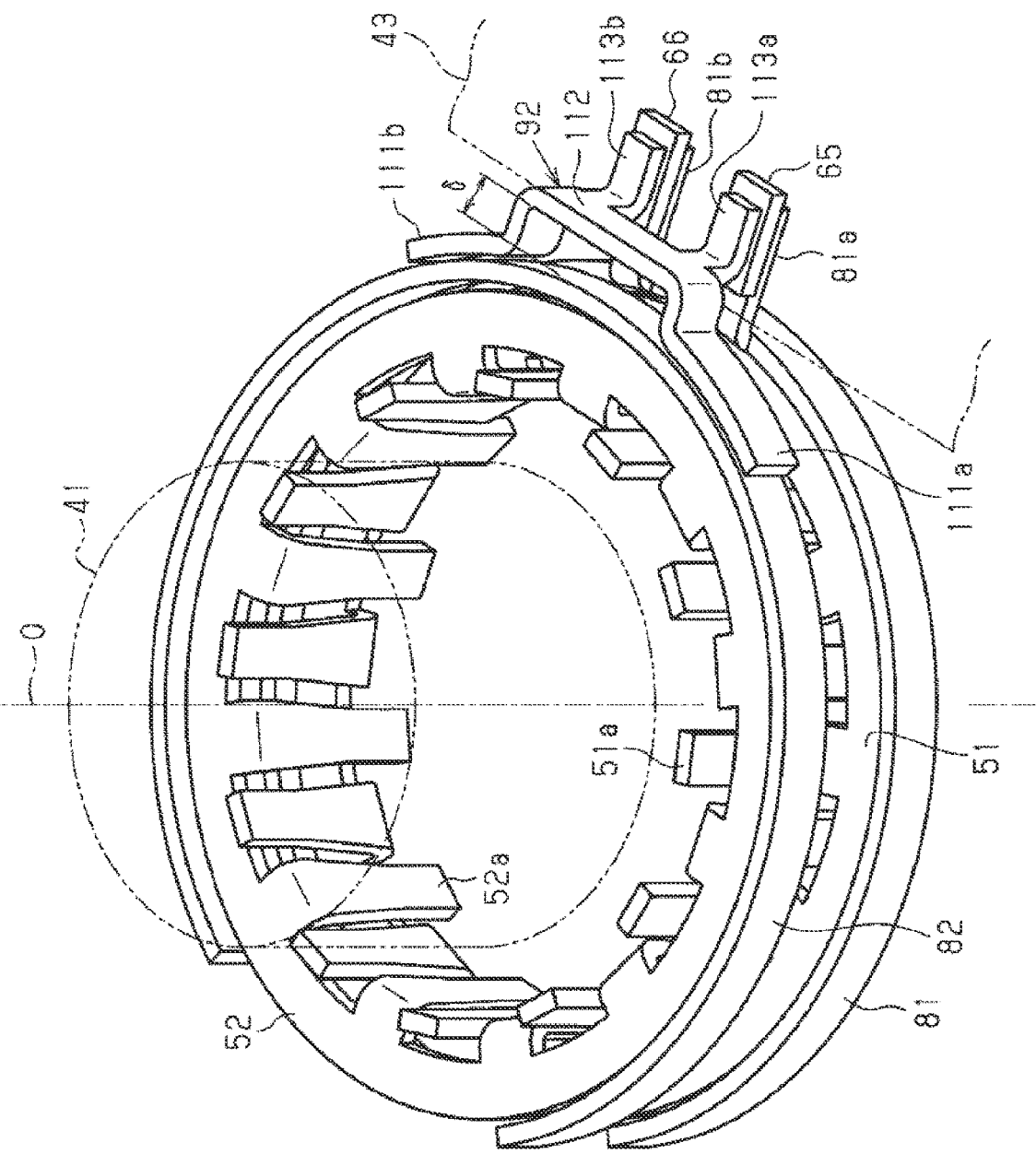
FIG. 11 is a perspective view illustrating the positional relationship among yokes, magnetism collection rings, and a core according to the embodiment.

As illustrated in FIG. 11, the permanent magnet 41 is positioned inside the two yokes 51, 52 with the sensor device 24 assembled. A clearance is formed between the respective inner peripheral surfaces of the two yokes 51, 52 and the outer peripheral surface of the permanent magnet 41 over the entire circumference. In addition, the magnetism collection ring 81 and the magnetism collection ring 82 are held at a position corresponding to the yoke 51 and the yoke 52, respectively, in the direction along the axis O of the pinion shaft 13. The magnetism collection ring 81 surrounds the periphery of the yoke 51. The magnetism collection ring 82 surrounds the periphery of the yoke 52. A clearance is formed between the magnetism collection ring 81 and the yoke 51 and between the magnetism collection ring 82 and the yoke 52 over the entire circumference.

The magnetism collection ring 81 induces magnetic flux from the yoke 51. The magnetism collection ring 82 induces magnetic flux from the yoke 52.

In addition, the core 92 is held at a position corresponding to the magnetism collection ring 82 in the direction along the axis O of the pinion shaft 13 with the sensor device 24 assembled. The two arm portions 111a, 111b of the core 92 are held in proximity to the outer peripheral surface of the magnetism collection ring 82. The core 92 induces magnetic flux from the magnetism collection ring 82.

In addition, a clearance δ is formed between the inner surface of the coupling portion 112 of the core 92 and the outer peripheral surface of the magnetism collection ring 82. The partial assembly 44 that is provided with the core 92 can be mounted to the inside of the second housing chamber 73 via the opening portion 73a of the sensor housing 45, even in the case where the reinforcement member 151 is present between the first housing chamber 72 and the second housing chamber 73 inside the sensor housing 45, by setting the size of the clearance δ in accordance with the size of the reinforcement member 151. The two arm portions 111a, 111b of the core 92 can be brought into proximity to the outer peripheral surface of the magnetism collection ring 82 by providing the core 92 in such a manner as to detour around the reinforcement member 151.

In addition, the two magnetism collection projecting portions 113a, 113b of the core 92 and the two magnetism collection projecting portions 81a, 81b of the magnetism collection ring 81 oppose each other in the direction along the axis O of the pinion shaft 13. The magnetic sensors 65, 66 for torque detection that are provided on the circuit board 43 are interposed between the magnetism collection projecting portions 113a, 113b and the magnetism collection projecting portions 81*a*, 81*b*, respectively. The magnetic sensors 65, 66 detect magnetic flux induced by the magnetism collection rings 81, 82 and the core 92.

When the torsion bar 32 of the pinion shaft 13 is torsionally deformed through an operation of the steering wheel 11, the respective relative positions of the permanent magnet 41 and the two yokes 51, 52 in the rotational direction are varied. Accordingly, the density of magnetic flux induced from the permanent magnet 41 to the magnetism collection rings 81, 82 through the yokes 51, 52 is varied. In addition, the density of magnetic flux induced from the magnetism collection ring 82 to the core 92 is also varied.

The magnetic sensor 65 generates an electric signal that matches magnetic flux that leaks between the magnetism collection projecting portion 81*a* of the magnetism collection ring 81 and the magnetism collection projecting portion 113*a* of the core 92. The magnetic sensor 66 generates an electric signal that matches magnetic flux that leaks between the magnetism collection projecting portion 81*b* of the magnetism collection ring 81 and the magnetism collection projecting portion 113*b* of the core 92. That is, the electric signals that are generated by the magnetic sensors 65, 66 are varied in accordance with torsional deformation, and hence the torsional angle, of the torsion bar 32. The control device 25 detects, as the steering torque, torque that acts on the torsion bar 32 on the basis of the electric signals that are generated by the magnetic sensors 65, 66.

Function of Embodiment

Next, the function of the sensor device 24 configured as discussed earlier will be described. It is necessary that the sensor device 24 should meet various requirements in accordance with the product specifications. Examples of the items required for the sensor device 24 include environmental requirements, output requirements, and connector directions.

The environmental requirements are requirements based on the environment in which the sensor device 24 is installed, and roughly include the following two requirements (A1) and (A2). It should be noted, however, that examples of the installation environment for the sensor device 24 include conditions such as the ambient temperature, humidity, and vibration around the sensor device 24:

(A1) The sensor device 24 supports the normal installation environment; and (A2) The sensor device 24 supports an environment that is severer than the normal installation environment.

The output requirements are detection functions required for the sensor device 24, and include the following requirements (B1) to (B3):

(B1) The sensor device 24 has both a torque detection function and an angle detection function;

(B2) The sensor device 24 has only a torque detection function; and (B3) The sensor device 24 has only an angle detection function.

The connector directions are requirements about the direction of extension of the connector fitting portion 76 of the sensor housing 45, and include the following requirements (C1) and (C2):

(C1) The connector fitting portion 76 extends along a first direction along the axis O of the pinion shaft 13; and (C2) The connector fitting portion 76 extends along a second direction that is orthogonal to the axis O of the pinion shaft 13.

The sensor device 24 according to the present embodiment meets the environmental requirement (A1), the output requirement (B1), and the connector direction requirement (C1).

As described above, there are various combinations of requirements for the sensor device 24. Therefore, it may be necessary to review the design of the sensor device 24 in accordance with the requirements, which may increase the product cost or the manufacture cost of the sensor device 24. In addition, it is also necessary to prepare wide variations of constituent parts of the sensor device 24 in accordance with the product specifications.

For example, in the case where the sensor device 24 is to support an environment that is severer than the normal installation environment, it is conceivable that the sensor device 24 adopts the following configuration. That is, the sensor housing 45 is formed from aluminum, core parts that are made of a synthetic resin and are required to demonstrate a detection function required for the sensor device 24 are designed separately from the sensor housing 45, and such core parts are installed in the sensor housing 45 that is made of aluminum. In the case where the sensor device 24 is to support the normal installation environment, in contrast, it is conceivable to form the sensor housing 45 from a synthetic resin material and provide some of the core parts, which are made of a synthetic resin, integrally with the sensor housing 45. As described above, the sensor device 24 may be configured differently in accordance with the environment in which the sensor device 24 is installed.

In the sensor device 24 according to the present embodiment, in this respect, core parts required to demonstrate a detection function required for the sensor device 24 are provided as the partial assembly 44, and the partial assembly 44 is attached to the sensor housing 45. The core parts include the holder 91, the core 92, the magnetic shields 93, 94, the torsion coil spring 95, the driven gears 96, 97, and the gear stopper 98.

Therefore, the output requirement for the sensor device 24 can be supported as follows, for example. In the case where it is necessary to meet the requirement (B2) mentioned earlier, that is, in the case where the sensor device 24 is required to have only a torque detection function, for example, only the holder 91, the core 92, and the gear stopper 98 are assembled as the partial assembly 44. It should be noted, however, that the core 92 is molded integrally with the holder 91 by resin molding. In this case, the magnetic shields 93, 94, the torsion coil spring 95, and the driven gears 96, 97 are not used.

In the case where it is necessary to meet the requirement (B3) mentioned earlier, that is, in the case where the sensor device 24 is required to have only an angle detection function, meanwhile, only the holder 91, the magnetic shields 93, 94, the torsion coil spring 95, the driven gears 96, 97, and the gear stopper 98 are assembled as the partial assembly 44. In this case, the core 92 is not used.

As described above, the same parts can be used as the core parts, irrespective of the output requirement for the sensor device 24, by selectively changing the core part to be assembled as the partial assembly 44 of the sensor device 24 in accordance with the output requirement for the sensor device 24. In addition, the environmental requirement and the connector direction requirement for the sensor device 24 can also be supported by just changing the material or the shape of the sensor housing 45 in accordance with such requirements.

It should be noted, however, that the specifications of the portion of attachment between the sensor housing 45 and the partial assembly 44 are preferably standardized, irrespective of the material or the shape of the sensor housing 45. As described above, the partial assembly 44 can be attached to the sensor housing 45, either in the case where the core parts are rearranged or in the case where the external shape or the material of the sensor housing 45 is changed. The phrase "specifications of the portion of attachment between the sensor housing 45 and the partial assembly 44" refers to the configuration of engagement between the engagement projecting portions 104, 105, in a U-shape, of the holder 91 and the engagement projecting portions 152, 153 that constitute a portion of the sensor housing 45.

Effect of Embodiment

Thus, the following effects can be obtained with the present embodiment. The holder 91, the core 92, the magnetic shields 93, 94, the torsion coil spring 95, the driven gears 96, 97, and the gear stopper 98 are prepared as core parts required to demonstrate the detection function of the sensor device 24, and core parts to be assembled as the partial assembly 44 are selectively changed in accordance with the detection function required for the sensor device 24. Therefore, the same parts can be used as the core parts, irrespective of the detection function required for the sensor device 24. Therefore, an increase in the number of variations of constituent parts of the partial assembly 44, and hence the sensor device 24, can be suppressed. In addition, the development cost or the design cost of the sensor device 24 can be reduced in accordance with an amount corresponding to the commonization of the constituent parts of the partial assembly 44.

For the environmental requirement and the connector direction requirement, it is only necessary to change the material or the shape of the sensor housing 45. It is not necessary to make any change to the partial assembly 44 that is housed inside the sensor housing 45. Therefore, variations of the material or the shape of the sensor housing 45 can be supported flexibly and inexpensively.

In attaching the partial assembly 44 to the sensor housing 45, the engagement projecting portions 104, 105, which have the shape of a U-shaped plate, of the partial assembly 44 are engaged with the two engagement projecting portions 152, 153, respectively, which are provided inside the second housing chamber 73. Therefore, a fall of the partial assembly 44 from the second housing chamber 73 is suppressed. In addition, the partial assembly 44 can be easily mounted by being inserted into the second housing chamber 73.

After the partial assembly 44 is attached to the inside of the second housing chamber 73 via the opening portion 73a of the sensor housing 45, the opening portion 73a is closed by the cover 46. Therefore, entry of dust or a liquid into the sensor housing 45 is suppressed. In addition, the second housing chamber 73 is tightly closed by the cover 46, and therefore there is no need to provide the partial assembly 44 with a liquid-tight function. Thus, complication of the configuration of the partial assembly 44, or an increase in the number of parts of the partial assembly 44, can be suppressed.

In addition, the partial assembly 44 does not have a function as the sensor housing 45. Therefore, an increase in the number of variations of the holder 91 can be suppressed, unlike the case where the holder 91 of the partial assembly 44 constitutes a part of the sensor housing 45, for example.

The circuit board 43 and the partial assembly 44 are provided inside the second housing chamber 73 in the state of being stacked on each other in the direction along the axis O of the pinion shaft 13. Therefore, an increase in the size of the sensor housing 45 in a direction that is orthogonal to the axis O of the pinion shaft 13 is suppressed, unlike the case where the circuit board 43 and the partial assembly 44 are provided as arranged on the same plane, for example.

The reinforcement member 151 is provided inside the second housing chamber 73 that opens via the opening portion 73a. Therefore, the rigidity of the sensor housing 45 can be secured while securing the opening area of the opening portion 73a. The operation to the circuit board 43 and the partial assembly 44 to the second housing chamber 73 is easier as the opening area of the opening portion 73a is larger.

The sensor device 24 detects the rotational angle of the main driving gear 54 on the basis of the respective rotational angles of the two driven gears 96, 97 that are meshed with the main driving gear 54. Therefore, looseness due to backlash at two clearances between the main driving gear 54 and the driven gear 96 and between the main driving gear 54 and the driven gear 97 may affect the precision in computing the rotational angle of the main driving gear 54, particularly in the case where the main driving gear 54 starts rotating operation or in the case where the rotational direction of the main driving gear 54 is reversed. In this respect, with the present embodiment, the driven gears 96, 97 are maintained in the state of being pushed against the main driving gear 54 by the elastic force of the torsion coil spring 95 with the sensor device 24 completely assembled. Therefore, the clearances between the teeth of the driven gears 96, 97 and the teeth of the main driving gear 54 can be reduced. In addition, the precision in computing the rotational angle of the main driving gear 54 is improved in accordance with an amount by which the looseness due to the backlash is suppressed.

The two support holes 101, 102 of the holder 91 are long holes that extend along the radial direction of the main driving gear 54. Therefore, the driven gears 96, 97 can be moved toward the direction away from the main driving gear 54 against the elastic force of the torsion coil spring 95 in the case where an external force in the direction along the direction of extension of the support holes 101, 102 acts on the driven gears 96, 97 toward the direction away from the main driving gear 54 when assembling the sensor device 24, for example. Thus, the driven gears 96, 97 that are supported by the holder 91 are protected.

Other Embodiments

The present embodiment may be modified as follows. The two support holes 101, 102 that are provided in the holder 91 may be round holes that have an inside diameter that matches the outside diameter of the shaft portions 132, 135 of the driven gears 96, 97, respectively, rather than long holes. With this configuration, effects that are similar to those of the embodiment described above can be obtained.

While the magnetic shields 93, 94 are provided on the holder 91 in the present embodiment, the magnetic shields 93, 94 may be provided on the shaft portions 132, 135 of the driven gears 96, 97, respectively. The torsion coil spring 95 may be omitted from the partial assembly 44. The magnetic shields 93, 94 may be omitted from the partial assembly 44.

The gear stopper 98 may be omitted from the partial assembly 44. In this case, the driven gears 96, 97 may be held on the holder 91 by different holding means other than the gear stopper 98. For example, the holder 91 may be provided with a portion for holding the driven gears 96, 97, or retaining rings may be mounted to the respective distal ends of the shaft portions 132, 135 of the driven gears 96, 97. With this configuration, a fall of the driven gears 96, 97 from the holder 91 can be suppressed.

While the magnetism collection ring 81 is provided with the two magnetism collection projecting portions 81a, 81b and the core 92 is provided with the two magnetism collection projecting portions 113a, 113b in the present embodiment, the magnetism collection ring 81 and the core 92 may be provided with one magnetism collection projecting portion each. In this case, it is only necessary to interpose one magnetic sensor (65 or 66) between one magnetism collection projecting portion of the magnetism collection ring 81 and one magnetism collection projecting portion of the core 92.

While the main driving gear 54 is formed integrally with the holder 53 of the magnetic yoke 42 in the present embodiment, the main driving gear 54 and the magnetic yoke 42 may be provided as separate parts. In the case where this configuration is adopted, the pinion shaft 13 may be provided with only the magnetic yoke 42 as a separate part from which the main driving gear 54 is omitted when it is necessary to meet the requirement (B2) mentioned earlier, that is, when the sensor device 24 is required to have only a torque detection function, for example. Meanwhile, the pinion shaft 13 may be provided with only the main driving gear 54 as a separate part when it is necessary to meet the requirement (B3) mentioned earlier, that is, when the sensor device 24 is required to have only an angle detection function.

While the two driven gears 96, 97 which are meshed with the main driving gear 54 are provided as components for detecting the rotational angle θpa of the pinion shaft 13 in the present embodiment, the sensor device 24 may be configured to have a single driven gear 96 or driven gear 97. Also in this manner, the rotational angle θpa of the pinion shaft 13 within 360° can be detected. Alternatively, the sensor device 24 may be configured to have three or more driven gears. With this configuration, the rotational angle θpa of the pinion shaft 13 for multiple rotations exceeding 360° can be detected.

While the sensor device 24 is applied to an electric power steering system (EPS) as an example of a steering device of a vehicle in the present embodiment, the sensor device 24 is also applicable to a steer-by-wire steering system. In addition, the sensor device 24 is not limited to use for vehicles.

What is claimed is:

1. A sensor device comprising:
a partial assembly constituted by selectively mounting to a holder a part that is a driven wheel and that is a magnetism collection member, the magnetism collection member being configured to induce magnetic flux that matches torsion of a shaft as a detection target, and the driven wheel being configured to rotate in conjunction with rotation of the shaft;
a circuit board provided with a detector configured to detect a rotational angle of the driven wheel and the magnetic flux induced by the magnetism collection member in accordance with the part mounted to the holder; and
a sensor housing that is penetrated by the shaft and that houses the partial assembly and the circuit board, wherein:
the partial assembly includes a holding member that holds the driven wheel on the holder,
the sensor housing is configured to suppress entry of dust or a liquid into the sensor housing, and
the partial assembly does not have a function as the sensor housing and the holder does not constitute a part of the sensor housing.

2. The sensor device according to claim 1, wherein the holder includes an engagement portion, the partial assembly being held inside the sensor housing with the engagement portion engaged with a portion of the sensor housing.

3. The sensor device according to claim 1, wherein the holding member is mounted to the holder so as to cover the driven wheel.

4. The sensor device according to claim 1, wherein the sensor housing includes a cover that closes an opening portion that opens toward a direction that intersects with an axis of the shaft, the cover being provided on an assumption that the sensor housing includes a housing chamber that houses the partial assembly and the circuit board via the opening portion.

5. The sensor device according to claim 1, wherein the shaft is rotated in conjunction with an operation of a steering wheel.

* * * * *